United States Patent
Jain et al.

(10) Patent No.: US 12,445,325 B2
(45) Date of Patent: Oct. 14, 2025

(54) ACTIVE TUNNEL SELECTION FOR FACILITATING LOOP-FREE LAYER-2 TRAFFIC FORWARDING IN AN OVERLAY NETWORK

(71) Applicant: Hewlett Packard Enterprise Development LP, Houston, TX (US)

(72) Inventors: Rajeev Jain, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 17/976,691

(22) Filed: Oct. 28, 2022

(65) Prior Publication Data

US 2024/0146575 A1    May 2, 2024

(51) Int. Cl.
*H04L 12/46* (2006.01)
*H04L 45/64* (2022.01)

(52) U.S. Cl.
CPC ...... *H04L 12/4633* (2013.01); *H04L 12/4641* (2013.01); *H04L 45/64* (2013.01)

(58) Field of Classification Search
None
See application file for complete search history.

(56) References Cited

U.S. PATENT DOCUMENTS

| | | |
|---|---|---|
| 6,169,724 B1 | 1/2001 | Begum et al. |
| 2008/0267081 A1 | 10/2008 | Roeck |
| 2008/0291910 A1 * | 11/2008 | Tadimeti .............. H04L 49/357 370/389 |
| 2009/0219821 A1 | 9/2009 | Kamachi et al. |
| 2009/0274054 A1 | 11/2009 | Wakumoto et al. |
| 2009/0282145 A1 | 11/2009 | Niimi |
| 2010/0238806 A1 | 9/2010 | Saito et al. |
| 2011/0238346 A1 | 9/2011 | Song et al. |

(Continued)

FOREIGN PATENT DOCUMENTS

WO    WO-2011140890 A1 *    11/2011    ............. H04L 45/22

OTHER PUBLICATIONS

Aruba, loop-protect re-enable timer, downloaded Jul. 12, 2023 (1 page).

(Continued)

*Primary Examiner* — Christine T Duong
(74) *Attorney, Agent, or Firm* — Trop, Pruner & Hu, P.C.

(57) ABSTRACT

A system for facilitating loop-free traffic forwarding is provided. During operation, the system can operate a switch as a tunnel endpoint for a plurality of tunnels with corresponding remote endpoints. The system can determine a tunnel network identifier (TNI) associated with a respective virtual local area network (VLAN) configured at the switch. The system can then enable the TNI for a first tunnel among the plurality of tunnels for carrying traffic of the VLAN. Here, traffic of the VLAN is only forwarded over the first tunnel. Therefore, the system can prevent the rest of the plurality of tunnels from looping the traffic of the VLAN back to the switch. The system can select a second tunnel as a standby tunnel for the TNI from the rest of the plurality of tunnels. If the first tunnel is unavailable, the system can enable the TNI for the second tunnel for traffic forwarding.

20 Claims, 9 Drawing Sheets

(56) References Cited

U.S. PATENT DOCUMENTS

| | | | |
|---|---|---|---|
| 2013/0003601 | A1 | 1/2013 | Gupta et al. |
| 2016/0254980 | A1 | 9/2016 | Nakayasu |
| 2020/0067821 | A1 | 2/2020 | Sebastian |
| 2021/0377166 | A1* | 12/2021 | Brar .................. H04L 49/201 |
| 2022/0209994 | A1 | 6/2022 | Tai |
| 2023/0344743 | A1 | 10/2023 | Mullis |
| 2024/0022451 | A1 | 1/2024 | Dikshit et al. |

OTHER PUBLICATIONS

Cisco, "ACI Layer 2 loop detection and Mitigation", available online at <https://www.youtube.com/watch?v=fFZ3d-bnD0c>, Feb. 23, 2022, 14 pages.

cisco.com, Configuring Loop Detection Guard, downloaded Jul. 12, 2023 (6 pages).

Hengartner et al., Detection and Analysis of Routing Loops in Packet Traces, 2002 (6 pages).

Hewlett Packard Enterprise Development, "Configuring loop protection," May 4, 2023, https://www.arubanetworks.com/techdocs/AOS-CX/10.09/HTML/l2_bridging_4100i-6000-6100-6200/Content/Chp_loop_pro/cnf-loo-pro.htm (2 pages).

Hewlett Packard Enterprise, Loop Protection, 2018 (3 pages).

Juniper Networks, Loop Protection for Spanning-Tree Protocols, Feb. 18, 2021 (20 pages).

Let Us Simplify Technology, "12 How L2 loop detection works using MCP policy in ACI", available online at <12 How L2 loop detection works using MCP policy in ACI-YouTube>, Apr. 12, 2020, 3 pages.

Lukas Krattiger, "Detecting and Mitigating Loops in VXLAN Networks", available online at <https://blogs.cisco.com/datacenter/detecting-and-mitigating-loops-in-vxlan-networks>, Sep. 16, 2020, 12 pages.

Pluribus Networks, "Achieving a Loop-Free Layer 2 Topology", available online at <<https://techdocassets.pluribusnetworks.com/netvisor/nv1_700/CG/AchievingaLoop-FreeLayer2Topolo1.html>.>, Netvisor One Configuration Guide 7.0.0, , Feb. 2022, 6 pages.

Shambhu Nath Mishra, "Live Demo!! Layer-2 switching loop in the network and mitigation without STP", available online at <https://www.youtube.com/watch?v=TWnEkuz6Et4>, Jun. 7, 2021, 9 pages.

Wikipedia, "Swtiching loop," May 20, 2022, <https://en.wikipedia.org/w/index.php?title=Switching_loop&oldid=1088889091>.

Wikipedia, "Type-length-value," Apr. 29, 2023, https://en.wikipedia.org/w/index.php?title=Type%E2%80%93length%E2%80%93value&oldid=1152349261 (2 pages).

* cited by examiner

ACTIVE TUNNEL SELECTION FOR FACILITATING LOOP-FREE LAYER-2 TRAFFIC FORWARDING IN AN OVERLAY NETWORK

BACKGROUND

Field

The present disclosure relates to communication networks. More specifically, the present disclosure relates to a method and system for selecting an active tunnel from redundant tunnels for a respective virtual local area network (VLAN) at a switch for facilitating loop-free traffic forwarding in an overlay network.

BRIEF DESCRIPTION OF THE FIGURES

In the figures, like reference numerals refer to the same figure elements.

DETAILED DESCRIPTION

Figure 1:
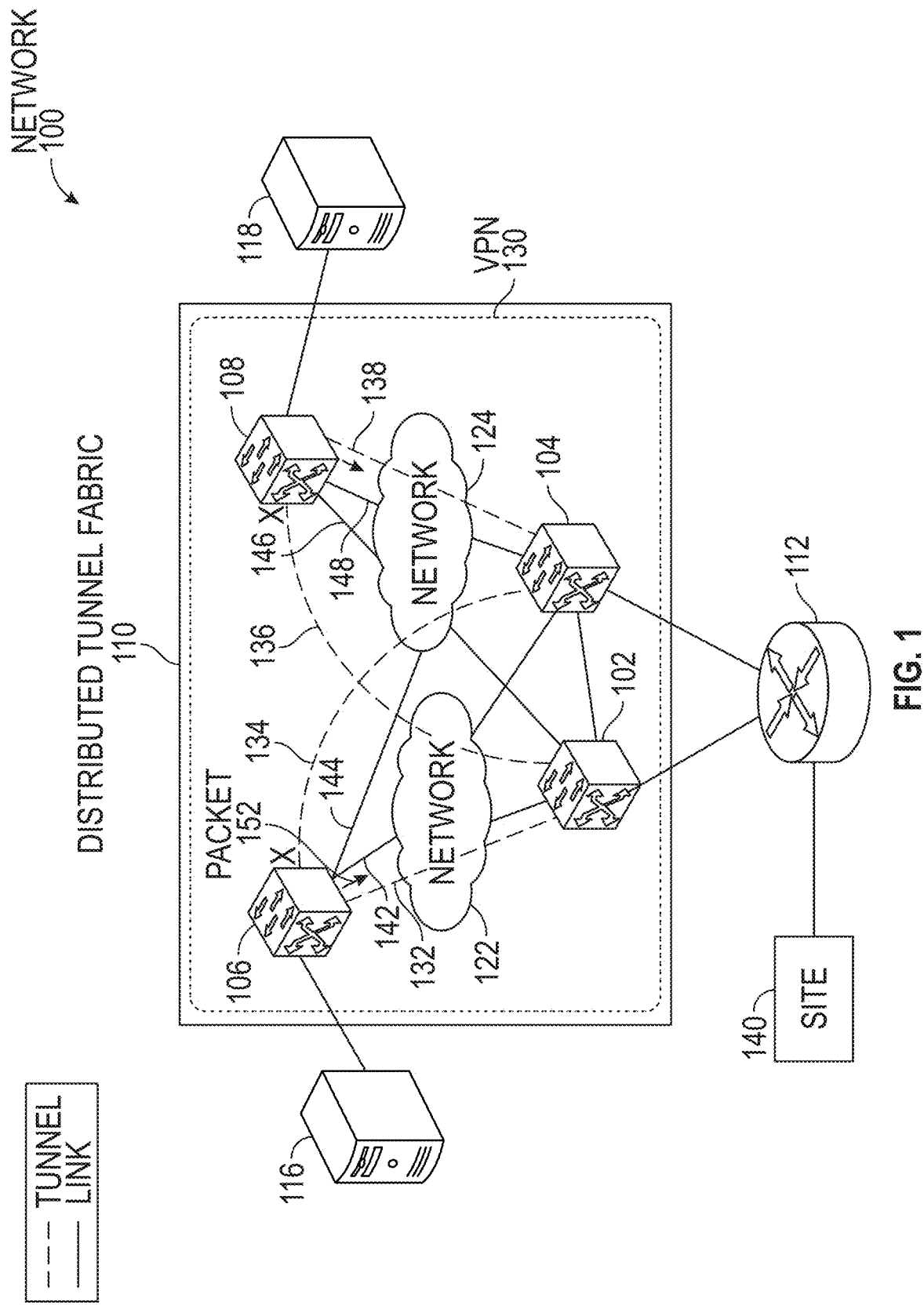
FIG. 1 illustrates an example of an overlay network supporting active tunnel selection for facilitating loop-free traffic forwarding, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, equipment vendors race to build switches with versatile capabilities. To do so, a switch may support different protocols and services. For example, the switch can support overlay tunnels between switches. Note the overlay tunnels are different from conventional underlay networks. With convention underlay networks, a lower-layer protocol (such Ethernet) can encapsulate an upper-layer protocol (such as IP). In contrast, an overlay tunnel uses an upper-layer protocol, such as a layer-3 protocol, for a tunnel and carry traffic of a lower-layer protocol, such as a layer-2 protocol. One such example is Ethernet over IP, where Ethernet frames are carried over an IP-based tunnel. Hence, an overlay tunnel can be overlaid over one or more underlying networks spanning different administrative domains. A network deploying overlay tunnels can be referred to as an overlay network. The switch can then facilitate traffic forwarding over the tunnels. For example, an Ethernet virtual private network (EVPN) can be deployed as an overlay over a set of virtual extensible local area networks (VXLANs).

To forward traffic over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. To forward a packet over a tunnel, a tunnel endpoint can encapsulate the packet with a tunnel header that can include the TNI. The packet is then forwarded based on the tunnel header until the encapsulated packet reaches the receiving tunnel endpoint, which can reside in a geographically distant network. Hence, the overlay network may span across one or more other networks of different administrative domains, ensuring loop-free traffic forwarding in a distributed network can be challenging.

The aspects described herein solve the problem of facilitating loop-free traffic forwarding among redundant overlay tunnels from a switch in an overlay network by (i) distributing the VLANs among the redundant tunnels, thereby selecting an active tunnel from the redundant tunnels for a respective VLAN; and (ii) configuring a TNI associated with the VLAN for only the active tunnel. As a result, for a respective TNI, the switch can forward traffic via the active tunnel. Hence, the packets belonging to the corresponding VLAN cannot use the other tunnels (e.g., another tunnel of the redundant tunnels) of the overlay network to loop back to the switch.

With existing technologies, there are multiple protocols available for detecting layer-2 loops in a network and blocking ports for removing the loop from the network. Some of these protocols can be capable of detecting layer-2 loops spanning a tunnel. For example, spanning-tree protocol (STP) over VXLAN can facilitate loop detection over VXLAN tunnels. Nonetheless, configuring a loop detection process, such as configuring STP, at tunnel endpoints in the overlay network can be challenging. In particular, a respective endpoint of the tunnel may need to support the same protocol to establish a network-wide spanning tree. However, the overlay network may deploy different types of switches (e.g., different classes of switches, from different vendors, etc.) and hence, may not use the same protocol. Furthermore, propagation of the topology-change information for the spanning tree across tunnel endpoints may require additional configuration. In addition, since an overlay network can be geographically dispersed, such a protocol may be relatively slow to react to the topology change.

To solve this problem, a switch in the overlay network can distribute the locally configured VLANs among the redundant tunnels from the switch. An edge switch can be coupled to a plurality of core switches via corresponding redundant tunnels in the overlay network. The switch can use one of the tunnels as an active tunnel for forwarding traffic toward the edge switches. To forward traffic via the active tunnel, the switch can determine a local egress port associated with the active tunnel and send the traffic via the egress port. The rest of the tunnels of the redundant tunnels can be configured as standby tunnels. To facilitate loop-free traffic forwarding in the overlay network, the switch can select the active tunnel for a respective VLAN.

The switch can then determine the TNI associated with the VLAN and configure the TNI for the selected active tunnel, thereby enabling the TNI for the tunnel. The switch may not configure the TNI for the rest of the redundant tunnels, which can operate standby tunnels for the VLAN. As a result, the TNI remains disabled for the standby tunnels and only the active tunnel for the VLAN is allowed forward traffic belonging to the VLAN. Consequently, the traffic of the VLAN cannot use the other tunnels to loop back to the switch. For example, if the switch is coupled to three core switches via corresponding tunnels, the switch can use one of the tunnels for forwarding tunnels to the core network. The VLANs configured for the switch can be divided into three subsets, and each subset can be deployed over one of the tunnels.

Accordingly, the tunnel can become the active tunnel for the corresponding subset of VLANs. Hence, the TN's for the subset of VLANs can be configured on the active tunnel. As a result, a single tunnel can be responsible for carrying traffic of a particular VLAN, thereby ensuring loop-free forwarding in the overlay mesh. Furthermore, since at least one other tunnel can be selected as a standby tunnel, if the tunnel becomes unavailable, the TNI can be enabled for the standby tunnel, which reassociates the VLAN with the standby tunnel. In this way, the switch can efficiently adapt to topology changes and reduce its impact on the flow of traffic.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of an overlay network supporting active tunnel selection for facilitating loop-free traffic forwarding, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include an overlay network 110 comprising switches 102, 104, 106, and 108, each of which can be associated with a media access control (MAC) address and an IP address.

In FIG. 1, a respective link denoted with a dotted line in network 110 can be a tunnel. Switches of network 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multi-protocol label switching (MPLS). A respective link denoted with a solid line in fabric 110 can be a link in an underlying network (or an underlay network) of network 110. For example, links 142 and 144 of the underlying network can be coupled to switch 106, and links 146 and 148 of the underlying network can be coupled to switch 108. The underlying network can be a physical network, and a respective link of the underlying network can be a physical link. A VPN 130, such as an Ethernet VPN (EVPN), can be deployed over network 110. In this example, switches 102 and 104 can be at a site 140 and coupled to a core switch 112. Hosts (or end devices) 116 and 118 can be coupled to switches 106 and 108, respectively.

In network 110, switch 106 can be coupled to switches 102 and 104 via tunnels 132 and 134, respectively. Similarly, switch 108 can be coupled to switches 102 and 104 via tunnels 136 and 138, respectively. Tunnels 132 and 136 can be established via an underlying network 122 (e.g., a layer-3 network). On the other hand, tunnels 134 and 138 can be established via another underlying network 124. Here, networks 122 and 124 can be local-area networks or wide-area networks (e.g., the Internet). A layer-2 network can be extended from switch 106 to site 140 via tunnels 132 and 134. Accordingly, to forward traffic of the layer-2 network (e.g., received from host 116) toward site 140, switch 106 can use either tunnel 132 or 134. Hence, tunnels 132 and 134 can be redundant tunnels for the layer-2 network. Similarly, because switch 108 can use either tunnel 136 or 138 to forward layer-2 traffic (e.g., received from host 118), tunnels 136 and 138 can be redundant tunnels for the layer-2 network.

At site 140, switches 102 and 104 can maintain a link between them for sharing control and/or data packets. The link can be a layer-2 or layer-3 connection that allows data forwarding between switches 102 and 104. The link can also be based on a tunnel between switches 102 and 104 (e.g., a VXLAN tunnel). To forward traffic via tunnel 132 in network 110, switch 106 can operate as a tunnel endpoint while switch 102 can be the other tunnel endpoint. Between switches 106 and 102, there can be a set of paths (e.g., equal-cost multiple paths or ECMP) in network 122. A respective path in network 122 can be used to exchange traffic over tunnel 132.

With existing technologies, there are multiple protocols available for detecting layer-2 loops in network 110 and blocking ports for removing the loop from network 110. Some of these protocols can be capable of detecting layer-2 loops caused by tunnels 132 and 134, or tunnels 136 and 138. For example, STP over VXLAN can facilitate loop detection over VXLAN tunnels. Nonetheless, configuring a loop detection process, such as configuring STP, at tunnel endpoints in network 110 can be challenging. To run STP over tunnels 132, 134, 136, and 138, switches 102, 104, 106, and 108 need to support STP to establish a spanning tree for network 110. However, these switches may belong to different classes or from different vendors, they may not use the same protocol. Furthermore, propagation of the topology-change information for the spanning tree in network 110 may require additional configuration. In addition, since network 110 can be geographically dispersed, such a protocol may be relatively slow to react to the topology change.

To solve this problem, switch 106 can select an active tunnel from tunnels 132 and 134 for forwarding layer-2 traffic to site 140. Typically, switch 106 may use a high-availability protocol for links 142 and 144 for protected VLANs. Switch 106 can facilitate failover to a respective protected VLAN. Examples of a high-availability protocol can include, but are not limited to, a flex link protocol and a SmartLink protocol. Switch 106 can use the high-availability protocol to use one of links 142 and 144, such as tunnel 142, as an active link for forwarding layer-2 traffic for the protected VLANs. Switch 106 can then block layer-2 traffic from being forwarded over link 144 while link 142 remains operational. In other words, switch 106 may forward traffic of the protected VLANs over link 142 and refrain from forwarding such traffic over link 144.

In the same way, switch 108 can use the high-availability protocol to use link 148 as an active link for forwarding layer-2 traffic for the protected VLANs. Switch 108 can then block layer-2 traffic from being forwarded over link 146 while tunnel 138 remains operational. It should be noted that the protected VLANs for switches 106 and 108 can be different. If link 142 or 148 becomes unavailable, the high-availability protocol can unblock link 144 or 146 at switch 106 or 108, respectively. This allows switch 106 or 108 to start forwarding layer-2 traffic via link 144 or 146, respectively. In this way, the high-availability protocol can support quick failover with quick convergence.

Similar to the operations of the high-availability protocol, switches 106 and 108 can select an active tunnel for forwarding layer-2 traffic toward site 140 to ensure loop-free forwarding of layer-2 traffic in network 110. The other tunnels can remain in a standby state. In some examples, switch 106 may use the high-availability protocol to determine which tunnel to use for forwarding layer-2 traffic. In particular, the high-availability protocol may select the tunnel that uses link 142 as an active tunnel and select the other tunnel(s) as the standby tunnel(s). If switch 106 forwards layer-2 traffic over tunnel 132 (denoted with an arrow) while blocking layer-2 traffic over tunnel 134 (denoted with a cross), traffic is forwarded to site 140 via a single tunnel. As a result, tunnel 134 cannot be used to forward that traffic back to switch 106. Similarly, if switch 108 forwards layer-2 traffic over tunnel 138 while blocking layer-2 traffic over tunnel 138, traffic is forwarded to site 140 via a single tunnel. As a result, tunnel 136 cannot be used to forward that traffic back to switch 108.

For example, switch 106 can forward a layer-2 packet 152 via tunnel 132. To do so, switch 106 can encapsulate packet 152 with an encapsulation header. The source and destination addresses of the encapsulation header can correspond to switches 106 and 102, respectively. Switch 106 can then determine a local egress port associated with tunnel 132 and send encapsulated packet 152 via the egress port. Accordingly, switch 102 can receive encapsulated packet 152 from tunnel 132, decapsulate the encapsulation header, and obtain packet 152. Subsequently, if switch 102 distributes packet 152 at site 140, switch 104 can receive packet 152. However, since tunnel 134 remains blocked at switch 106, switch 104 cannot use tunnel 134 to forward packet 152 back to switch 106. In particular, even if packet 152 is a multi-destination packet (e.g., a broadcast, unknown unicast, or multicast (BUM) packet), packet 152 may not be looped back to switch 106.

To block layer-2 traffic of a particular VLAN on tunnel 134, switch 106 can remove the configuration of the TNI associated with the VLAN from tunnel 134, thereby disabling the TNI at tunnel 134. Since the TNI can then become unconfigured for tunnel 134, switch 106 does not consider tunnel 134 as a tunnel via which traffic associated with the TNI can be forwarded. Switch 106 can track the tunnel reachability information associated with a respective tunnel using a detection protocol for a tunnel (e.g., Bidirectional Forwarding Detection (BFD) protocol for a tunnel). If switch 106 determines that tunnel 132 has become unavailable, switch 106 can configure the TNI for tunnel 134, thereby enabling the TNI at tunnel 134. Switch 106 may disable the TNI for tunnel 132 to ensure that tunnel 132 cannot be used upon recovery while tunnel 134 is operational for the VLAN. In this way, switch 106 can facilitate efficient loop-free forwarding of layer-2 traffic in an overlay network.

Figure 2A:
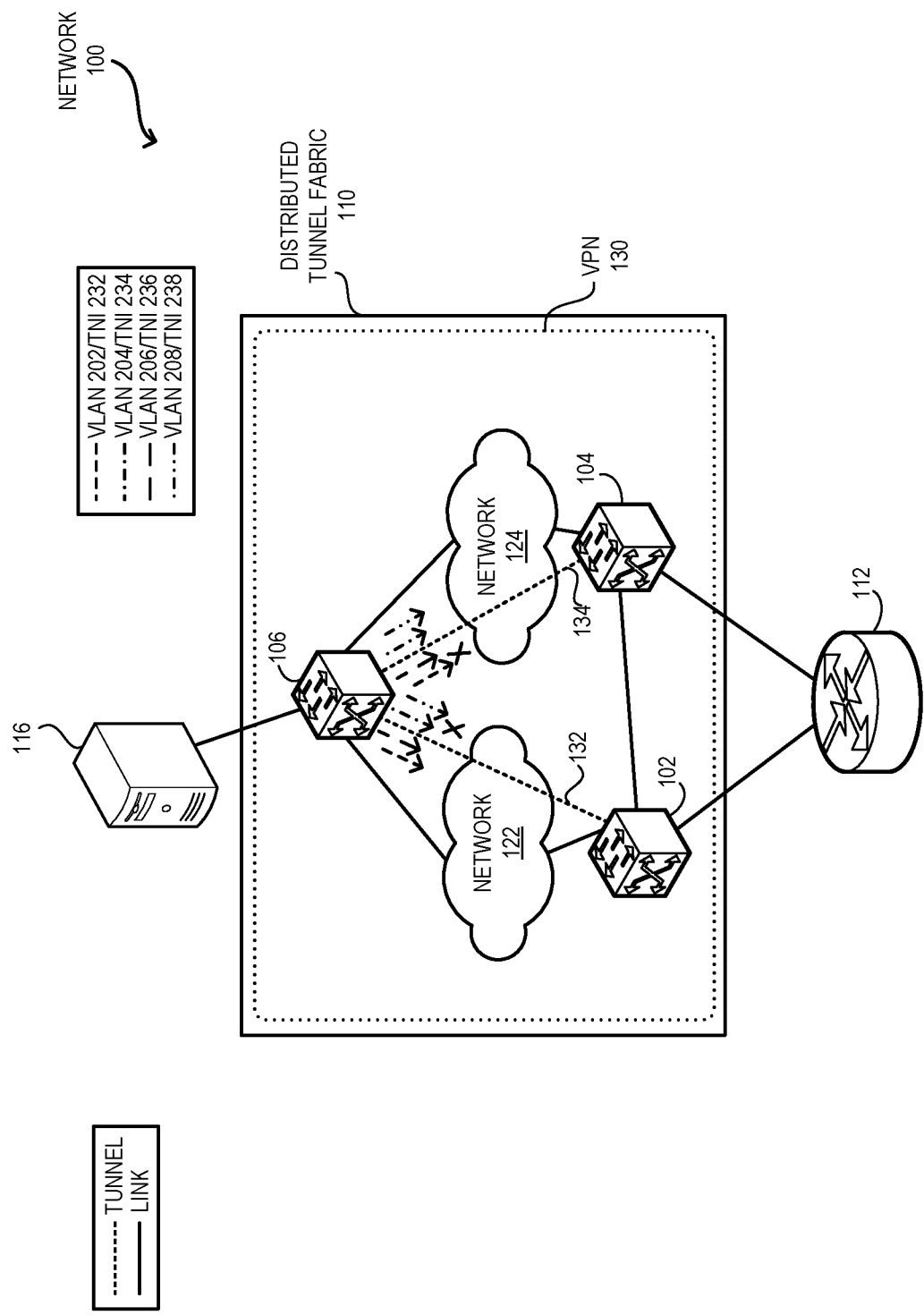
FIG. 2A illustrates an example of an overlay network supporting active tunnel selection for individual VLANs for facilitating loop-free traffic forwarding, in accordance with an aspect of the present application.

FIG. 2A illustrates an example of an overlay network supporting active tunnel selection for individual VLANs for facilitating loop-free traffic forwarding, in accordance with an aspect of the present application. In this example, VLANs 202, 204, 206, and 208 can be configured at switch 106. TN's 232, 234, 236, and 238 can be mapped to VLANs 202, 204, 206, and 208, respectively. A respective TNI can be any identifier that can identify a local layer-2 network, such as a VLAN, in a tunnel. For example, if tunnels 132 and 134 are VXLAN tunnels, a TNI can be a VNI. To prevent loops in network 110, switch 106 can distribute the locally configured VLANs 202, 204, 206, and 208 among tunnels 132 and 134. For each of these VLANs, switch 106 can select an active tunnel and at least one standby tunnel from tunnels 132 and 134.

Switch 106 can use one of tunnels 132 and 134 as an active tunnel for forwarding traffic toward site 140 for a respective VLAN. The other tunnel can be configured as a standby tunnel. The active tunnel can be allowed to forward traffic of a VLAN while the standby tunnel may not forward traffic while the active tunnel remains operational. Switch 106 can apply a distribution policy to select the active tunnel for a VLAN. Examples of a distribution policy can include, but are not limited to, load balancing, round-robin, hash-based, and random. When switch 106 detects a VLAN, switch 106 can apply the distribution policy and determine which of tunnels 132 and 134 should be the active tunnel for that VLAN. Switch 106 can also use a combination of distribution policies. When switch 106 starts operation (e.g., boots up), switch 106 may not have any load or have low loads on tunnels 132 and 134. Switch 106 can then use round-robin or random distribution for distributing the VLANs.

On the other hand, when the traffic of the VLANs flows through tunnels 132 and 134, switch 106 can determine the active tunnels for a subsequent VLAN based on the respective loads on tunnels 132 and 134 (e.g., for facilitating load balancing). Switch 106 may also redistribute the already distributed VLANs based on the respective loads on tunnels 132 and 134. Switch 106 can allocate VLANs 202 and 206 to tunnel 132, and VLANs 204 and 208 to tunnel 134 based on the distribution policy of switch 106. Accordingly, switch 106 can select tunnel 132 as the active tunnel and tunnel 134 as the standby tunnel for VLANs 202 and 206. Similarly, switch 106 can select tunnel 134 as the active tunnel and tunnel 132 as the standby tunnel for VLANs 204 and 208.

Switch 106 can then determine TNIs 232, 234, 236, and 238 can be mapped to VLANs 202, 204, 206, and 208, respectively. Switch 106 can configure TNIs 232 and 236 for tunnel 132, and TNIs 234 and 238 for tunnel 134. Based on the configuration, switch 106 can enable TNIs 232 and 236 for tunnel 132, and TNIs 234 and 238 for tunnel 134. Since switch 106 may not configure TNIs 234 and 238 for tunnel 132, traffic belonging to VLANs 204 and 208 may not be forwarded via tunnel 132. Hence, active tunnel 132 for VLANs 202 and 206 is allowed to forward traffic belonging to VLANs 202 and 206. Hence, traffic belonging to VLANs 202 and 206 may not be forwarded via tunnel 134, and active tunnel 134 for VLANs 204 and 208 is allowed forward traffic belonging to VLANs 204 and 208.

In other words, switch 106 can disable TN's 232 and 236 for tunnel 134, and TN's 234 and 238 for tunnel 132. Consequently, traffic belonging to VLANs 202 and 206 cannot use tunnel 134, and traffic belonging to VLANs 204 and 208 cannot use tunnel 132 to loop back to switch 106. As a result, a single tunnel 132 can be responsible for carrying traffic of VLANs 202 and 206, and another single tunnel 134 can be responsible for carrying traffic of VLANs 204 and 208. Such allocation of an active tunnel for a respective VLAN can ensure loop-free forwarding in network 110 even when tunnels 132 and 134 span networks 122 and 124, respectively.

Figure 2B:
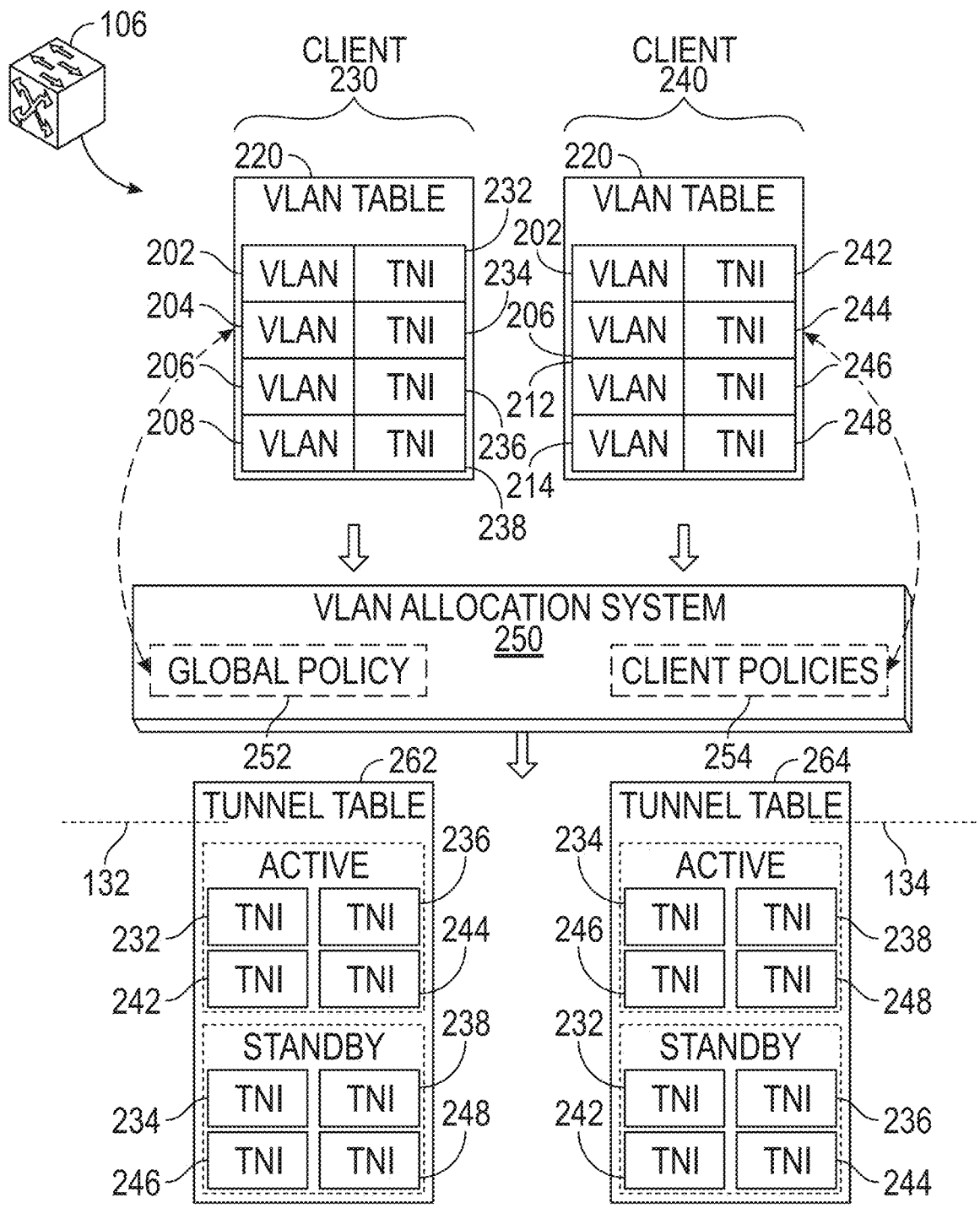
FIG. 2B illustrates examples of selection policies for facilitating active tunnel selection for individual VLANs, in accordance with an aspect of the present application.

Switch 106 can determine an active tunnel for a VLAN (i.e., allocate a VLAN to a tunnel) based on a selection policy. FIG. 2B illustrates examples of selection policies for facilitating active tunnel selection for individual VLANs, in accordance with an aspect of the present application. Switch 106 can deploy a VLAN allocation system 250 for providing a global policy 252 and one or more client policies 254 that can be used for allocating the VLANs configured at switch 106. A respective of client policies 254 can correspond to a client and indicate the client's preference of how the VLANs belonging to the client can be distributed among the redundant tunnels. On the other hand, if a policy is not defined for a client, system 250 can use global policy 252 to distribute the VLANs belonging to the client among the redundant tunnels. Furthermore, the client policy for a client may point to global policy 252, which suggests system 250 to use global policy 252 for the VLANs of that client.

Switch 106 can be configured with VLANs 202, 204, 206, and 208 for a client 230, and VLANs 202, 206, 212, and 214 for another client 240. Since each client may define a set of VLAN identifiers, they can overlap. Hence, VLANs 202 and 206 can be defined by both clients 230 and 240. Switch 106 can maintain a VLAN table 220 can map a respective VLAN to a corresponding TNI. A respective TNI can be unique for a respective VLAN at switch 106. Table 220 can store a respective VLAN to TNI mapping in association with the corresponding client (e.g., using a client identifier). In table 220, VLANs 202, 204, 206, and 208 of client 230 can be mapped by VLAN table 220 to TNIs 232, 234, 236, and 238, respectively, in association with client 230. Similarly, VLANs 202, 204, 212, and 214 of client 240 can be mapped to TNIs 242, 244, 246, and 248, respectively, in association with client 240. In this way, each of the TNIs at switch 106 can be unique for a respective VLAN of a respective client and hence, can uniquely identify a VLAN, regardless of its repetition for different clients, in a tunnel established at switch 106.

For a respective tunnel, switch 106 can maintain a tunnel table for indicating the active and standby status for the tunnel for a respective VLAN. In this example, switch 106 can maintain tunnel tables 262 and 264 for tunnels 132 and 134, respectively. Table 262 can store the TN's associated with the set of VLANs for which tunnel 132 operates as the active tunnel and the TN's associated with another set of VLANs for which tunnel 132 operates as the standby tunnel. Similarly, table 264 can store the TN's associated with the set of VLANs for which tunnel 134 operates as the active tunnel and the TN's associated with another set of VLANs for which tunnel 134 operates as the standby tunnel. Tables 262 and 264 allow switch 106 to determine which TN's to configure at which tunnel during regular operation and failover (e.g., for facilitating high availability).

A client policy 256, which can be one of client policies 254, can be defined for client 240 at switch 106. Accordingly, switch 106 can use client policy 256 to distribute VLANs 202, 206, 212, and 214 of client 240 among tunnels 132 and 134. Based on client policy 256, switch 106 can select tunnel 132 as the active tunnel for VLAN-VLANs 202 and 206, and tunnel 134 as the active tunnel for VLAN 212 and 214 of client 240. Hence, table 262 can indicate that TNIs 242 and 244 are active and TNIs 246 and 248 are on standby for tunnel 132. On the other hand, table 264 can indicate that TNIs 246 and 248 are active and TNIs 242 and 244 are on standby for tunnel 134. Based on tables 262 and 264, system 250 can configure TNIs 242 and 244 for tunnel 132 without configuring TNIs 246 and 248. System 250 can also configure TNIs 246 and 248 for tunnel 134 without configuring TNIs 242 and 244.

A client, such as client 230, may not provide a preference for distributing VLANs for loop-free traffic forwarding. Switch 106 can then use global policy 252 as a default policy. Accordingly, switch 106 can use global policy 252 to distribute VLANs 202, 204, 206, and 208 of client 230 among tunnels 132 and 134. Based on global policy 252, switch 106 can select tunnel 132 as the active tunnel for VLAN 202 and 206, and tunnel 134 as the active tunnel for VLAN 204 and 208 of client 230. Hence, table 262 can indicate that TN's 232 and 236 are active and TN's 234 and 238 are on standby for tunnel 132. On the other hand, table 264 can indicate that TN's 234 and 238 are active and TN's 232 and 236 are on standby for tunnel 134. Based on tables 262 and 264, system 250 can configure TN's 232 and 236 for tunnel 132 without configuring TN's 234 and 238. System 250 can also configure TN's 234 and 238 for tunnel 134 without configuring TN's 232 and 236. In this way, active tunnels for a respective VLAN can be selected based on corresponding policies.

Figure 3A:
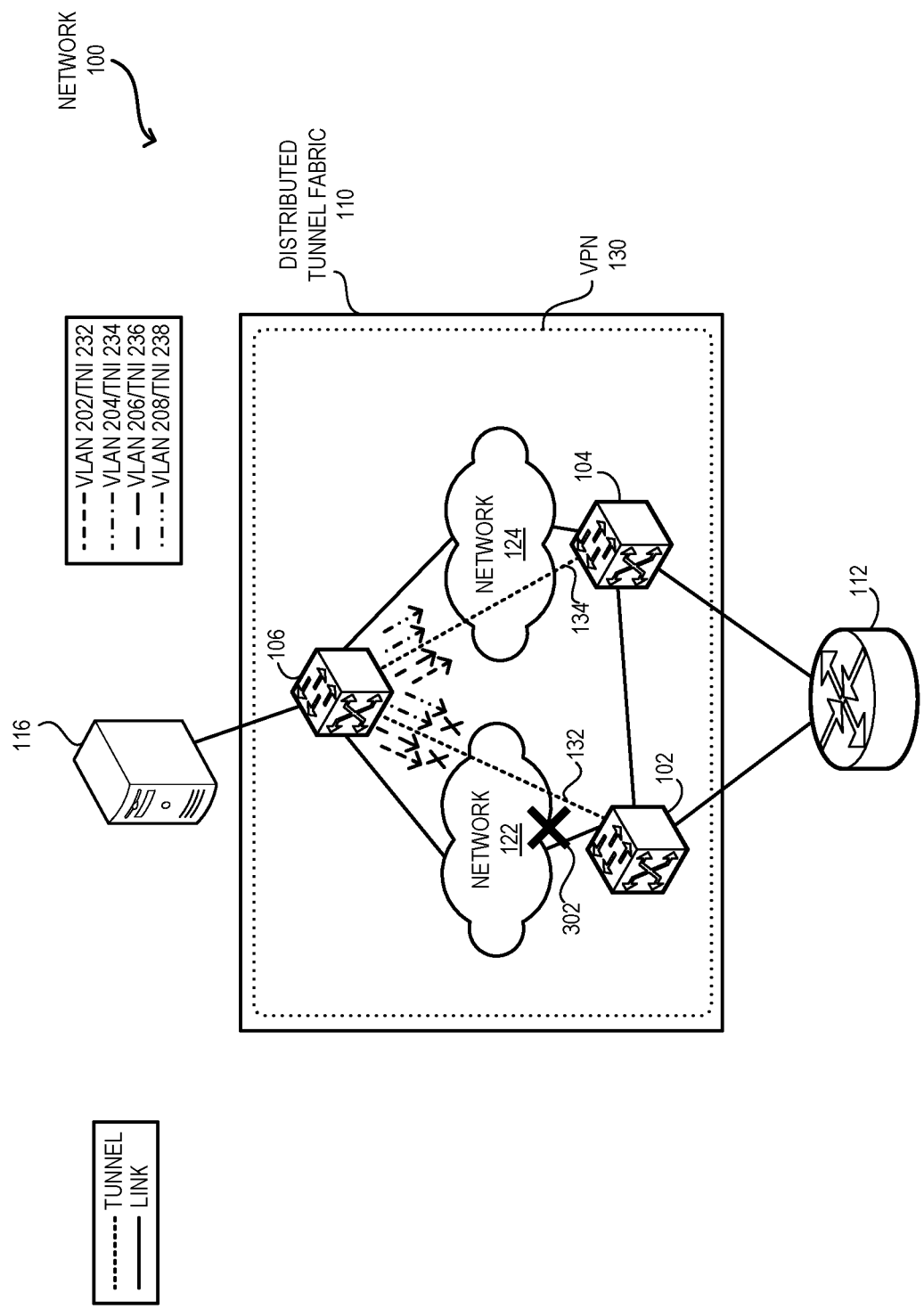
FIG. 3A illustrates an example of a failover in an overlay network supporting active tunnel selection for individual VLANs for facilitating loop-free traffic forwarding, in accordance with an aspect of the present application.

FIG. 3A illustrates an example of a failover in an overlay network supporting active tunnel selection for individual VLANs for facilitating loop-free traffic forwarding, in accordance with an aspect of the present application. To block layer-2 traffic of VLANs 202 and 206 on tunnel 134, switch 106 can remove the configuration of TN's 232 and 236 from tunnel 134. Since TN's 232 and 236 can then become unconfigured for tunnel 134, switch 106 does not consider tunnel 134 as a tunnel via which traffic associated with TNI 232 and 236 can be forwarded. In the same way, TN's 234 and 238 can be unconfigured for tunnel 132, and hence, switch 106 does not consider tunnel 132 as a tunnel via which traffic associated with TNI 234 and 238 can be forwarded.

Switch 106 can track the tunnel reachability information associated with tunnels 132 and 134 using a detection protocol for a tunnel (e.g., using a BFD protocol for a tunnel, such as VXLAN). Suppose that tunnel 132 becomes unavailable due to an event 302. Examples of event 302 can include, but are not limited to, a link failure, a node failure, a software upgrade, a power cycle, and a network reconfiguration. Switch 106 can detect the unavailability of tunnel 132 based on the detection protocol. Switch 106 can then configure TN's 232 and 236 for tunnel 134, thereby enabling tunnel 134 for forwarding traffic belonging to VLANs 202 and 206, respectively. Switch 106 may disable TN's 232 and 236 for tunnel 132 to ensure that tunnel 132 cannot be used upon recovery while tunnel 134 is operational for TN's 232 and 236. In this way, switch 106 can facilitate efficient loop-free forwarding of layer-2 traffic in an overlay network.

Figure 3B:
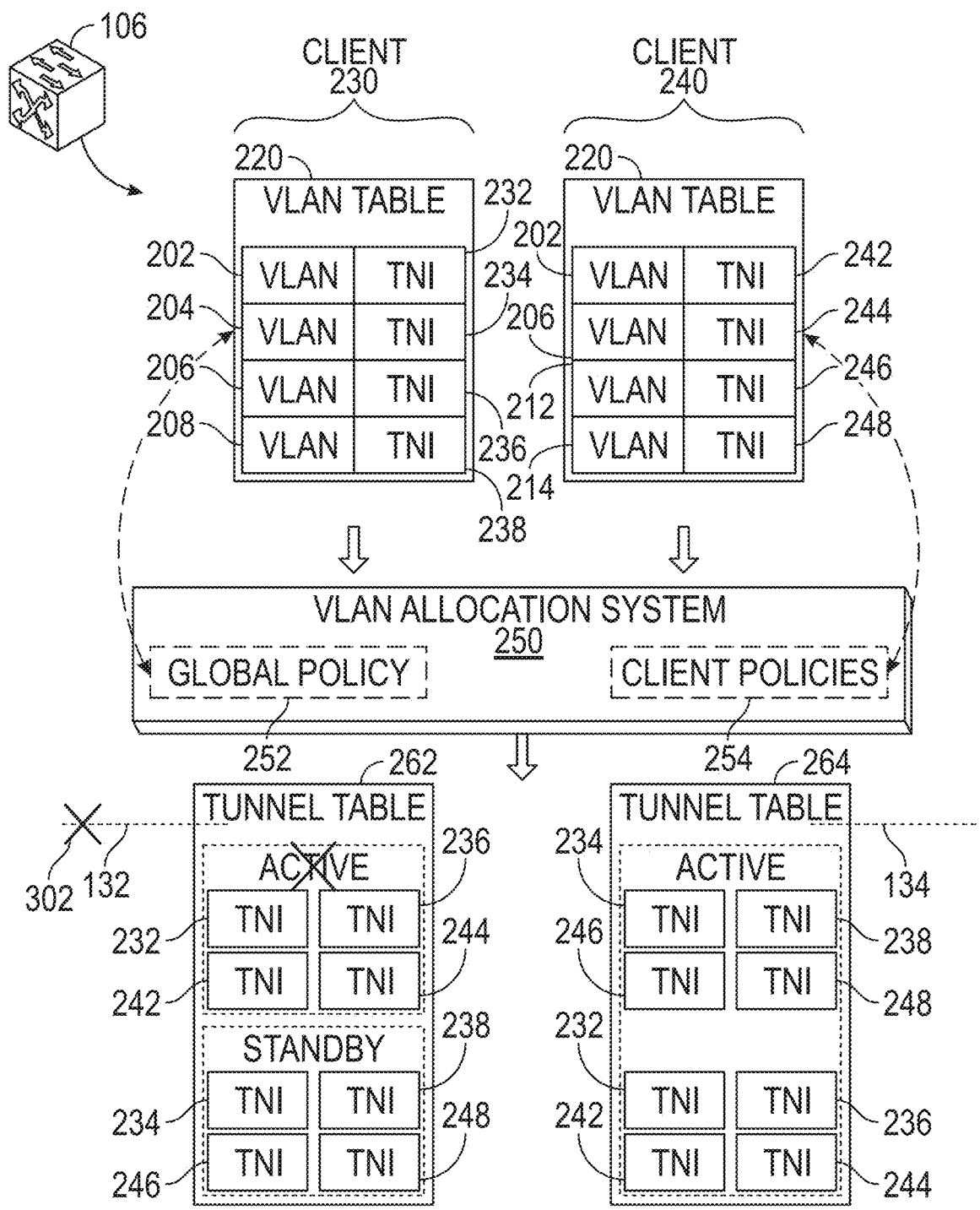
FIG. 3B illustrates an example of configuring individual VLANs at a standby tunnel during a failover in an overlay network, in accordance with an aspect of the present application.

FIG. 3B illustrates an example of configuring individual VLANs at a standby tunnel during a failover in an overlay network, in accordance with an aspect of the present application. Due to event 302, tunnel 132 can become unavailable. Consequently, tunnel 132 can no longer remain the active tunnel for TN's 232, 236, 242, and 244. Switch 106 can then remove the active indication for these TN's in table 262 (denoted with a cross). For example, switch 106 can indicate a standby status for TN's 232, 236, 242, and 244 in table 262, or remove them from table 262. Due to the failover, tunnel 134 can become the active tunnels for TN's 232, 236, 242, and 244. Accordingly, table 264 can store these TN's 232, 236, 242, and 244 as active TN's for tunnel 134. Switch 106 can then start forwarding traffic associated with TN's 232, 236, 242, and 244 via tunnel 134.

Figure 4:
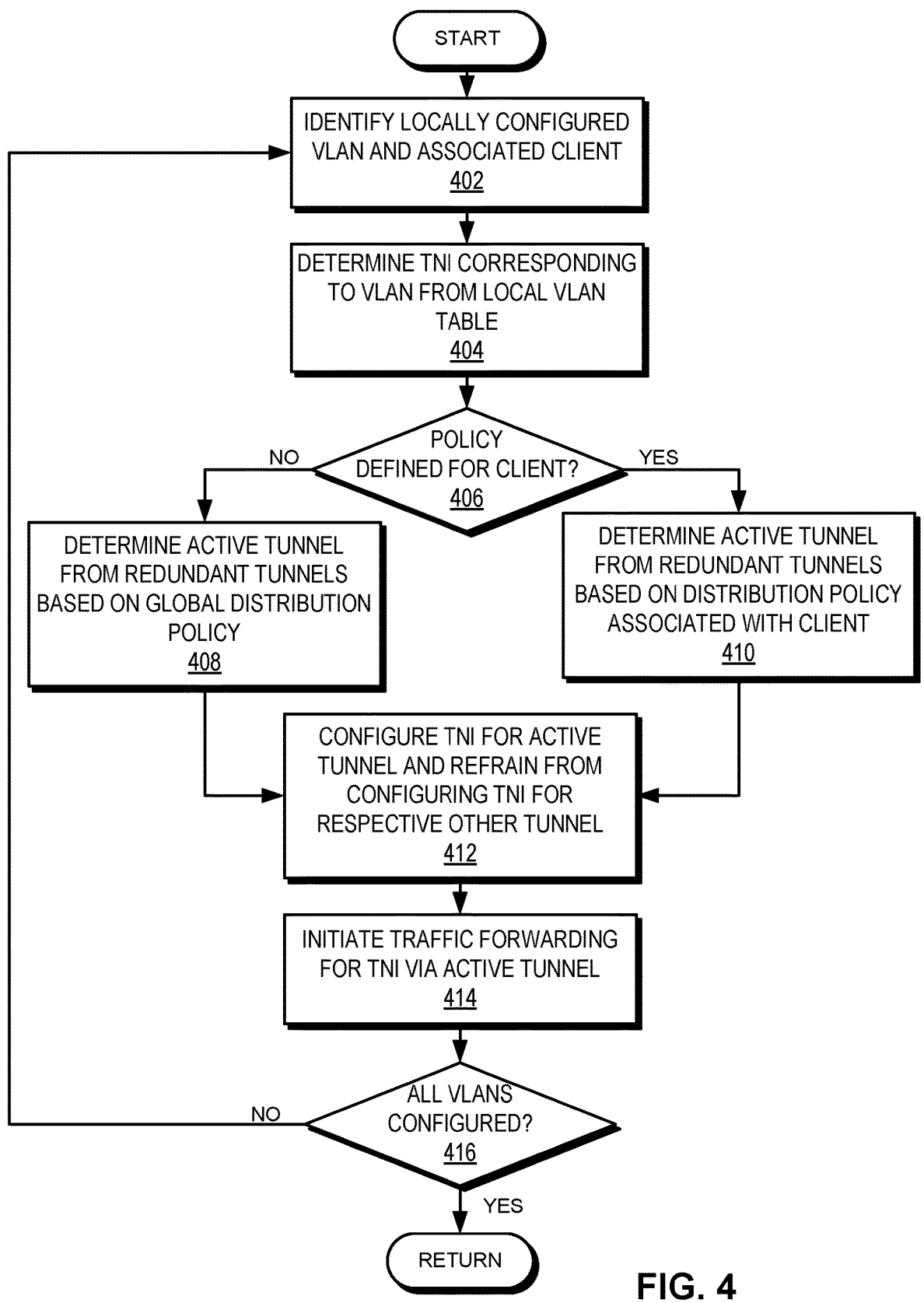
FIG. 4 presents a flowchart illustrating the process of a switch selecting an active tunnel for a VLAN for facilitating loop-free traffic forwarding in an overlay network, in accordance with an aspect of the present application.

FIG. 4 presents a flowchart illustrating the process of a switch selecting an active tunnel for a VLAN for facilitating loop-free traffic forwarding in an overlay network, in accordance with an aspect of the present application. During operation, the switch can identify a locally configured VLAN and the associated client (operation 402). The switch can then determine the TNI corresponding to the VLAN from the local VLAN table (operation 404). The switch can determine whether there is a distribution policy defined for the client (operation 406). If a policy is defined for the client, the switch can determine an active tunnel from the redundant tunnels for the VLAN from the redundant tunnels based on a distribution policy associated with the client (operation 410).

On the other hand, if a policy is not defined for the client, the switch can determine an active tunnel from the redundant tunnels for the VLAN from the redundant tunnels based on a global distribution policy (operation 408). Upon determining the active tunnel (operation 408 or 410), the switch can configure the TNI for the active tunnel and refrain from configuring the TNI for a respective other tunnel (i.e., the standby tunnels) (operation 412). The switch can initiate traffic forwarding for the TNI via the active tunnel (operation 414) and determine whether all VLANs are configured (operation 416). To forward traffic via the active tunnel, the switch can determine a local egress port associated with the active tunnel and send the traffic via the egress port. If all VLANs are not configured, the switch can continue to identify another locally configured VLAN and the associated client (operation 402).

Figure 5A:
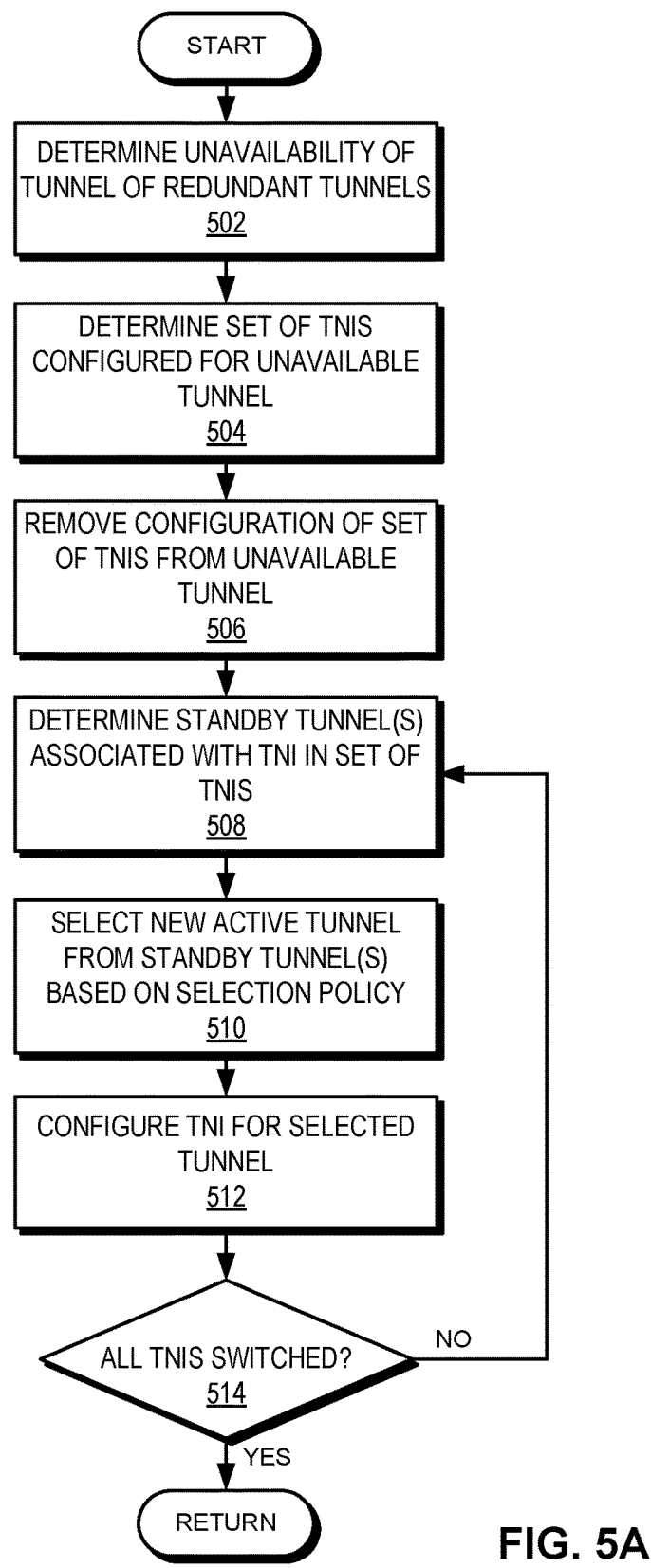
FIG. 5A presents a flowchart illustrating the process of a switch switching over to a standby tunnel for individual VLANs upon determining the unavailability of an active tunnel, in accordance with an aspect of the present application.

FIG. 5A presents a flowchart illustrating the process of a switch switching over to a standby tunnel for individual VLANs upon determining the unavailability of an active tunnel, in accordance with an aspect of the present application. During operation, the switch can determine the unavailability of a tunnel of the redundant tunnels (e.g., based on BFD for a tunnel) (operation 502). The switch can determine the set of TN's configured for the unavailable tunnel (operation 504) and remove the configuration of the set of TN's from the unavailable tunnel (operation 506). The removal can ensure that, upon recovery, the tunnel does not start forwarding traffic. The switch can then determine the standby tunnel(s) associated with a TNI in the set of TN's (operation 508).

Subsequently, the switch can select a new active tunnel from the standby tunnel(s) based on a selection policy (operation 510). If there are a plurality of standby tunnels, the selection policy can dictate which tunnel to select as the active tunnel. The selection policy can be based on one or more of: random selection, round-robin selection, and tunnel identifier-based selection. The switch can configure the TNI for the selected tunnel, thereby allowing the tunnel to forward traffic associated with the TNI (operation 512). The switch can then determine whether all TN's are switched (operation 514). If all TN's are switched, the switch can continue to determine the standby tunnel(s) associated with another TNI in the set of TN's (operation 508).

Figure 5B:
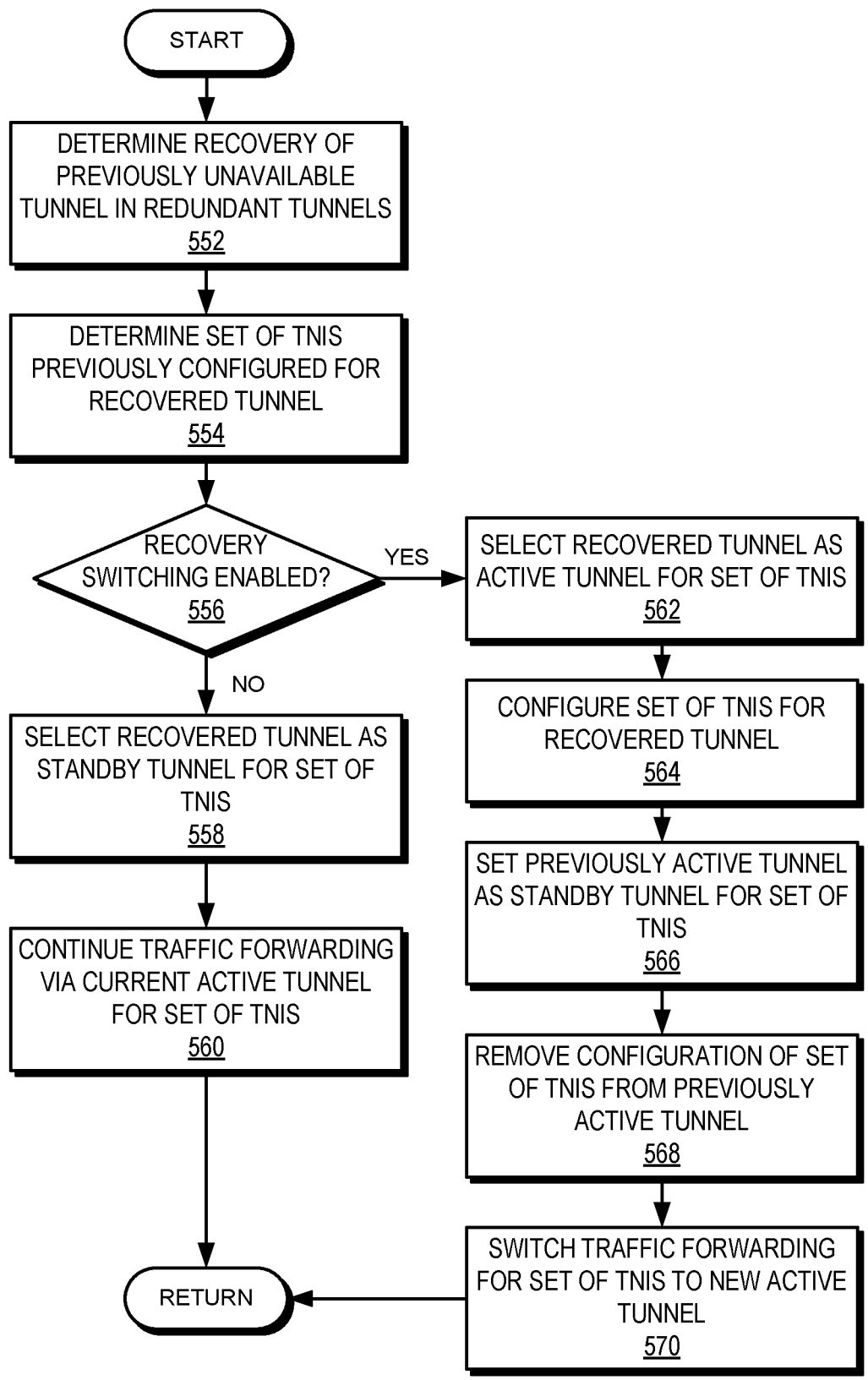
FIG. 5B presents a flowchart illustrating the process of a switch managing active and standby tunnels for individual VLANs upon determining the recovery of a tunnel, in accordance with an aspect of the present application.

FIG. 5B presents a flowchart illustrating the process of a switch managing active and standby tunnels for individual VLANs upon determining the recovery of a tunnel, in accordance with an aspect of the present application. During operation, the switch can determine the recovery of a previously unavailable tunnel in the redundant tunnels (e.g., using BFD for a tunnel) (operation 552). The switch can then determine a set of TN's previously configured for the recovered tunnel (operation 554) and determine whether the recovery switching is enabled for the tunnel (operation 556). If the recovery switching is not enabled, the switch can select the recovered tunnel as a standby tunnel for the set of TN's (operation 558) and continue traffic forwarding via the tunnel active tunnel for the set of TN's (operation 560).

On the other hand, if the recovery switching is enabled, the switch can select the recovered tunnel as the active tunnel for the set of TN's (operation 562) and configure the set of TN's for the recovered tunnel (operation 564). The configuration allows the recovered tunnel to forward traffic associated with the set of TNIs. The switch can then set the previously active tunnel as a standby tunnel for the set of TN's (operation 566) and remove the configuration of the set of TN's from the previously active tunnel (operation 568). Subsequently, the switch can switch traffic forwarding for the set of TN's to the new active tunnel (operation 570).

Figure 6:
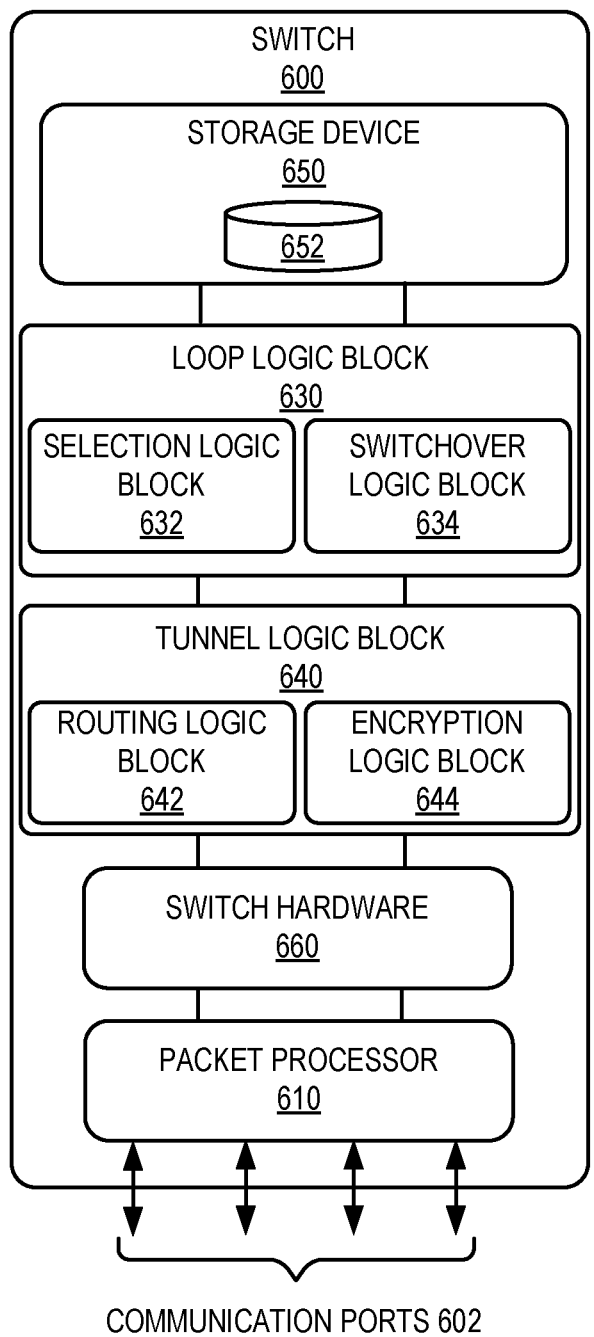
FIG. 6 illustrates an example of a switch supporting active tunnel selection for facilitating loop-free traffic forwarding in an overlay network, in accordance with an aspect of the present application.

FIG. 6 illustrates an example of a switch supporting active tunnel selection for facilitating loop-free traffic forwarding in an overlay network, in accordance with an aspect of the present application. In this example, a switch 600 can include a number of communication ports 602, a packet processor 610, and a storage device 650. Switch 600 can also include switch hardware 660 (e.g., processing hardware of switch 600, such as application-specific integrated circuit (ASIC) chips), which includes information based on which switch 600 processes packets (e.g., determines output ports for packets). In other words, switch hardware 660 includes switching circuitry for switch 600. Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a tunnel logic block 640 that can operate switch 600 as a tunnel endpoint by establishing a tunnel with a remote tunnel endpoint. Tunnel logic block 640 allows switch 600 to participate in an overlay network. Tunnel logic block 640 can include a routing logic block 642 and an encryption logic block 644. Routing logic block 642 can determine the routes or paths for the underlying network based on a routing protocol (e.g., Border Gateway Protocol (BGP)). Encryption logic block 644 can encrypt a respective packet sent to the tunnel with a tunnel encryption header (e.g., a VXLAN or GRE header).

Switch 600 can also include a loop logic block 630 that can facilitate loop-free layer-2 traffic forwarding from switch 600 over tunnels of the overlay network. Loop logic block 630 can include a selection logic block 632 and a switchover logic block 634. Selection logic block 632 can select an active tunnel from a set of redundant tunnels at switch 600 for a respective VLAN. To do so, selection logic block 632 can configure a TNI associated with the VLAN for the active tunnel and refrain from configuring the TNI for other tunnels. Furthermore, switchover logic block 634 can determine whether a tunnel has become unavailable. Upon determining the unavailability of an active tunnel, switchover logic block 634 can switch the forwarding of traffic for the VLAN to a standby tunnel. Switchover logic block 634 can then configure the TNI associated with the VLAN for the standby tunnel. In addition, switchover logic block 634 may switch the forwarding of traffic for the VLAN back to a recovered active tunnel.

One aspect of the present technology can provide a system for facilitating loop-free traffic forwarding in an overlay network. During operation, the system can operate a switch as a tunnel endpoint for a plurality of tunnels with corresponding remote endpoints in the overlay network. The system can determine a corresponding tunnel network identifier (TNI) associated with a respective virtual local area network (VLAN) configured at the switch. A TNI can identify the traffic of the VLAN over a tunnel. The system can then enable the TNI for a first tunnel among the plurality of tunnels for carrying traffic of the VLAN. Here, traffic of the VLAN is only forwarded over the first tunnel among the plurality of tunnels. Therefore, the system can prevent the rest of the plurality of tunnels from looping the traffic of the VLAN back to the switch. Subsequently, the system can select a second tunnel as a standby tunnel for the TNI from the rest of the plurality of tunnels. Upon detecting the unavailability of the first tunnel, the system can enable the TNI for the second tunnel, which allows the traffic of the VLAN over the second tunnel.

In a variation on this aspect, if the first tunnel is operational, the system can disable the TNI at the second tunnel for preventing the second tunnel from carrying the traffic of the VLAN.

In a further variation, the system can determine an egress port of the switch for a packet belonging to the VLAN, wherein the egress port is associated with the first tunnel.

In a variation on this aspect, upon detecting the unavailability of the first tunnel, the system can disable the TNI at the first tunnel by removing the configuration of the TNI for the active tunnel and configuring the TNI for the second tunnel.

In a variation on this aspect, the system can determine the unavailability of the first tunnel based on a protocol capable of detecting the availability of a tunnel.

In a variation on this aspect, the system can select the first tunnel as the active tunnel based on a selection policy. The selection policy includes one or more of: a global selection policy applicable to a respective VLAN configured at the switch; and a client-specific selection policy applicable to a respective VLAN of a client configured at the switch.

In a further variation, a plurality of VLANs can be configured at the switch. The system can apply the selection policy to select an active tunnel from the plurality of tunnels for a respective VLAN. In this way, the system can distribute the plurality of VLANs among the plurality of tunnels for forwarding traffic.

In a variation on this aspect, the system can determine the recovery of the first tunnel and determine wherein to enable the TNI for the recovered first tunnel.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
operating a switch as a tunnel endpoint for a plurality of tunnels with corresponding remote endpoints;
determining, by the switch, a first tunnel network identifier (TNI) identifying a first virtual local area network (VLAN) configured at the switch, and a second TNI identifying a second VLAN configured at the switch;
enabling, by the switch, the first TNI for a first tunnel of the plurality of tunnels for carrying traffic of the first VLAN, and disabling the second TNI for the first tunnel to block traffic of the second VLAN over the first tunnel to prevent looping of traffic of the second VLAN back to the switch;
maintaining, by the switch, a first data structure associated with the first tunnel and containing the first TNI, the second TNI, and information identifying the first TNI as enabled for the first tunnel and the second TNI as disabled for the first tunnel, the information identifying the first TNI as enabled for the first tunnel comprising an active indication;
selecting, by the switch, a second tunnel as a standby tunnel for the first TNI from a remainder of the plurality of tunnels; and
based on detecting unavailability of the first tunnel, enabling, by the switch, the first TNI for the second tunnel to allow traffic of the first VLAN over the second tunnel, the enabling of the first TNI for the second tunnel comprising setting, in a second data structure associated with the second tunnel and containing the first TNI, an active indication specifying the first TNI as enabled for the second tunnel.

2. The method of claim 1, further comprising:
based on the first tunnel being operational after the enabling of the first TNI for the second tunnel, disabling the first TNI for the second tunnel to prevent the second tunnel from carrying traffic of the first VLAN, the disabling of the first TNI for the second tunnel comprising removing, from the second data structure, the active indication specifying the first TNI as enabled for the second tunnel.

3. The method of claim 2, further comprising determining an egress port of the switch for a packet communicated in the first VLAN, wherein the egress port is associated with the first tunnel.

4. The method of claim 1, wherein the first data structure associated with the first tunnel comprises a first tunnel table, and the second data structure associated with the second tunnel comprises a second tunnel table.

5. The method of claim 1, further comprising:
tracking, by the switch, tunnel reachability information of the first tunnel to detect the unavailability of the first tunnel.

6. The method of claim 1, further comprising selecting the first tunnel as an active tunnel for the first VLAN based on a selection policy, wherein the selection policy includes one or more of:
a global selection policy applicable to the first VLAN configured at the switch; or
a client-specific selection policy of a client applicable to the first VLAN configured at the switch.

7. The method of claim 1, further comprising:
detecting, by the switch, a given VLAN; and
selecting, by the switch using a distribution policy, a tunnel of the plurality of tunnels as an active tunnel for the given VLAN.

8. The method of claim 1, further comprising:
determining a recovery of the first tunnel after detecting the unavailability of the first tunnel; and
determining whether to enable the first TNI for the recovered first tunnel.

9. A non-transitory computer-readable storage medium comprising instructions that when executed cause a switch to:
operate the switch as a tunnel endpoint for a plurality of tunnels with corresponding remote endpoints;
determine a first tunnel network identifier (TNI) identifying a first virtual local area network (VLAN) configured at the switch, and a second TNI identifying a second VLAN configured at the switch;
enable the first TNI for a first tunnel of the plurality of tunnels for carrying traffic of the first VLAN, and disable the second TNI for the first tunnel to block traffic of the second VLAN over the first tunnel to prevent looping of traffic of the second VLAN back to the switch;
maintain, at the switch, a first data structure associated with the first tunnel and containing the first TNI, the second TNI, and information identifying the first TNI as enabled for the first tunnel and the second TNI as disabled for the first tunnel, the information identifying the first TNI as enabled for the first tunnel comprising an active indication;
select a second tunnel as a standby tunnel for the first TNI from a remainder of the plurality of tunnels; and
in response to detecting unavailability of the first tunnel, enable the first TNI for the second tunnel to allow traffic of the first VLAN over the second tunnel, the enabling of the first TNI for the second tunnel comprising setting, in a second data structure associated with the second tunnel and containing the first TNI, an active indication specifying the first TNI as enabled for the second tunnel.

10. The non-transitory computer-readable storage medium of claim 9, wherein the instructions when executed cause the switch to, in response to the first tunnel being operational after the enabling of the first TNI for the second tunnel, disable the first TNI for the second tunnel to prevent the second tunnel from carrying traffic of the first VLAN, the disabling of the first TNI for the second tunnel comprising removing, from the second data structure, the active indication specifying the first TNI as enabled for the second tunnel.

11. The non-transitory computer-readable storage medium of claim 9, wherein the instructions when executed cause the switch to determine an egress port of the switch for a packet communicated in the first VLAN, wherein the egress port is associated with the first tunnel.

12. The non-transitory computer-readable storage medium of claim 9, wherein the instructions when executed cause the switch to, in response to detecting the unavailability of the first tunnel, disable the first TNI for the first tunnel by removing the active indication for the first TNI from the first data structure associated with the first tunnel.

13. The non-transitory computer-readable storage medium of claim 9, wherein the instructions when executed cause the switch to track tunnel reachability information of the first tunnel to detect the unavailability of the first tunnel.

14. The non-transitory computer-readable storage medium of claim 9, wherein the instructions when executed cause the switch to select the first tunnel as an active tunnel for the first VLAN based on a selection policy, wherein the selection policy includes one or more of:

a global selection policy applicable to the first VLAN configured at the switch; or a client-specific selection policy of a client applicable to the first VLAN configured at the switch.

15. The non-transitory computer-readable storage medium of claim 9, wherein the instructions when executed cause the switch to:

detect a given VLAN; and select, using a distribution policy, a tunnel of the plurality of tunnels as an active tunnel for the given VLAN.

16. The non-transitory computer-readable storage medium of claim 9, wherein the instructions when executed cause the switch to:

determine a recovery of the first tunnel; and enable the first TNI for the recovered first tunnel.

17. A switch comprising:

a processor; and a non-transitory storage medium storing instructions executable on the processor to:

operate the switch as a tunnel endpoint for a plurality of tunnels with corresponding remote endpoints;

determine a first tunnel network identifier (TNI) identifying a first virtual local area network (VLAN) configured at the switch, and a second TNI identifying a second VLAN configured at the switch;

enable the first TNI for a first tunnel of the plurality of tunnels for carrying traffic of the first VLAN, and disable the second TNI for the first tunnel to block traffic of the second VLAN over the first tunnel to prevent looping of traffic of the second VLAN back to the switch;

maintain, at the switch, a first data structure associated with the first tunnel and containing information identifying the first TNI as enabled for the first tunnel and the second TNI as disabled for the first tunnel, the information identifying the first TNI as enabled for the first tunnel comprising an active indication;

select a second tunnel as a standby tunnel for the first TNI from a remainder of the plurality of tunnels; and in response to detecting unavailability of the first tunnel, enable the first TNI for the second tunnel to allow the traffic of the first VLAN over the second tunnel, the enabling of the first TNI for the second tunnel comprising setting, in a second data structure associated with the second tunnel and containing the first TNI, an active indication specifying the first TNI as enabled for the second tunnel.

18. The method of claim 1, wherein the first data structure associated with the first tunnel contains a standby indication associated with the second TNI to specify that the second TNI is disabled for the first tunnel.

19. The non-transitory computer-readable storage medium of claim 9, wherein the first data structure associated with the first tunnel contains a standby indication associated with the second TNI to specify that the second TNI is disabled for the first tunnel.

20. The switch of claim 17, wherein the first data structure associated with the first tunnel contains a standby indication associated with the second TNI to specify that the second TNI is disabled for the first tunnel.

* * * * *